United States Patent
Cassapakis et al.

(10) Patent No.: US 7,904,895 B1
(45) Date of Patent: Mar. 8, 2011

(54) FIRMWARE UPDATE IN ELECTRONIC DEVICES EMPLOYING UPDATE AGENT IN A FLASH MEMORY CARD

(75) Inventors: Chris Cassapakis, Laguna Niguel, CA (US); Bindu Rama Rao, Laguna Niguel, CA (US)

(73) Assignee: Hewlett-Packard Develpment Company, L.P., Houston, TX (US)

( * ) Notice: Subject to any disclaimer, the term of this patent is extended or adjusted under 35 U.S.C. 154(b) by 1721 days.

(21) Appl. No.: 11/111,276

(22) Filed: Apr. 21, 2005

Related U.S. Application Data

(60) Provisional application No. 60/564,503, filed on Apr. 21, 2004.

(51) Int. Cl.
G06F 9/44 (2006.01)
G06F 12/00 (2006.01)

(52) U.S. Cl. ......... 717/168; 717/169; 717/170; 717/171; 711/115

(58) Field of Classification Search .................. None
See application file for complete search history.

(56) References Cited

U.S. PATENT DOCUMENTS

| | | |
|---|---|---|
| 5,261,055 A | 11/1993 | Moran et al. |
| 5,418,837 A * | 5/1995 | Johansson et al. ............ 455/558 |
| 5,442,771 A | 8/1995 | Filepp et al. |
| 5,479,637 A | 12/1995 | Lisimaque et al. |
| 5,579,522 A | 11/1996 | Christeson et al. |
| 5,596,738 A | 1/1997 | Pope |
| 5,598,534 A | 1/1997 | Haas |
| 5,608,910 A | 3/1997 | Shimakura |
| 5,623,604 A | 4/1997 | Russell et al. |
| 5,666,293 A | 9/1997 | Metz et al. |
| 5,752,039 A | 5/1998 | Tanimura |
| 5,778,440 A | 7/1998 | Yiu et al. |
| 5,781,921 A * | 7/1998 | Nichols ......................... 711/115 |
| 5,790,974 A | 8/1998 | Tognazzini |
| 5,878,256 A | 3/1999 | Bealkowski et al. |
| 5,960,445 A | 9/1999 | Tamori et al. |
| 6,009,497 A | 12/1999 | Wells et al. |
| 6,038,636 A | 3/2000 | Brown, III et al. |
| 6,064,814 A | 5/2000 | Capriles et al. |
| 6,073,206 A | 6/2000 | Piwonka et al. |
| 6,073,214 A | 6/2000 | Fawcett |

(Continued)

FOREIGN PATENT DOCUMENTS

CA 2339923 A 3/2000

(Continued)

OTHER PUBLICATIONS

WO 02/41147 A1, O'Neil, published on May 23, 2002.*

(Continued)

*Primary Examiner* — Insun Kang

(57) ABSTRACT

A controller in a removable memory card operatively coupled to an electronic device is employed by the electronic device to create a newer/updated version of firmware/software in the non-volatile memory of the electronic device. Update agent code in the removable memory card may use an old/original version of firmware/software in the electronic device to create the newer/updated version of firmware/software. During the creation of the newer/updated version of firmware/software in the flash memory card, the electronic device may be operational. A separate update agent in the electronic device may subsequently update the old/original version of firmware/software in the non-volatile memory of the electronic device using contents of the removable memory card, after a reboot or power-up of the electronic device.

20 Claims, 4 Drawing Sheets

U.S. PATENT DOCUMENTS

| | | | |
|---|---|---|---|
| 6,088,759 A | 7/2000 | Hasbun et al. | |
| 6,105,063 A | 8/2000 | Hayes, Jr. | |
| 6,112,024 A | 8/2000 | Almond et al. | |
| 6,112,197 A | 8/2000 | Chatterjee et al. | |
| 6,126,327 A | 10/2000 | Bi et al. | |
| 6,128,695 A | 10/2000 | Estakhri et al. | |
| 6,157,559 A | 12/2000 | Yoo | |
| 6,163,274 A | 12/2000 | Lindgren | |
| 6,198,946 B1 | 3/2001 | Shin et al. | |
| 6,279,153 B1 | 8/2001 | Bi et al. | |
| 6,311,322 B1 | 10/2001 | Ikeda et al. | |
| 6,400,965 B1* | 6/2002 | Phillips et al. | 455/558 |
| 6,438,585 B2 | 8/2002 | Mousseau et al. | |
| 6,741,934 B2* | 5/2004 | Chen et al. | 701/213 |
| 6,941,129 B2* | 9/2005 | Marce et al. | 455/414.1 |
| 7,210,010 B2* | 4/2007 | Ogle | 711/162 |
| 7,287,068 B1* | 10/2007 | Eriksson et al. | 709/221 |
| 7,376,711 B2* | 5/2008 | Du et al. | 709/219 |
| 7,469,306 B2* | 12/2008 | Ng | 710/74 |
| 2001/0029178 A1 | 10/2001 | Criss et al. | |
| 2001/0047363 A1 | 11/2001 | Peng | |
| 2001/0048728 A1 | 12/2001 | Peng | |
| 2001/0049263 A1* | 12/2001 | Zhang | 455/67.1 |
| 2002/0078209 A1 | 6/2002 | Peng | |
| 2002/0116261 A1 | 8/2002 | Moskowitz et al. | |
| 2002/0131404 A1 | 9/2002 | Mehta et al. | |
| 2002/0152005 A1 | 10/2002 | Bagnordi | |
| 2002/0156863 A1 | 10/2002 | Peng | |
| 2002/0157090 A1 | 10/2002 | Anton, Jr. | |
| 2003/0027563 A1 | 2/2003 | Herle et al. | |
| 2003/0033599 A1 | 2/2003 | Rajaram et al. | |
| 2003/0037075 A1 | 2/2003 | Hannigan et al. | |
| 2003/0061384 A1 | 3/2003 | Nakatani | |
| 2003/0226030 A1* | 12/2003 | Hurst et al. | 713/200 |
| 2003/0226137 A1* | 12/2003 | Nagao | 717/168 |
| 2004/0093597 A1* | 5/2004 | Rao et al. | 717/171 |
| 2004/0111582 A1* | 6/2004 | Maeda et al. | 711/202 |
| 2004/0194081 A1* | 9/2004 | Qumei et al. | 717/173 |
| 2004/0198447 A1* | 10/2004 | Larsson | 455/558 |
| 2004/0239975 A1* | 12/2004 | Kawaura et al. | 358/1.14 |
| 2004/0268041 A1* | 12/2004 | Smith | 711/115 |
| 2005/0038955 A1* | 2/2005 | Chen | 711/103 |
| 2005/0246703 A1* | 11/2005 | Ahonen | 717/172 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pages 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

FIRMWARE UPDATE IN ELECTRONIC DEVICES EMPLOYING UPDATE AGENT IN A FLASH MEMORY CARD

RELATED APPLICATIONS

The present application makes reference to, claims priority to, and claims benefit of U.S. Provisional Patent Application Ser. No. 60/564,503, entitled "Firmware Update In Electronic Devices Employing Update Agent In A Flash Memory Card", filed Apr. 21, 2004, the complete subject matter of which is hereby incorporated herein by reference, in its entirety.

The present application makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDAs) often contain firmware and/or application software that are either provided by the manufacturers of the electronic devices, by telecommunication carriers, or by third parties. These firmware and application software often contain bugs. New versions of firmware and software are periodically released to fix the bugs and/or to introduce new features.

Electronic devices such as high-end mobile phones, for example, often contain a flash memory card, some times called a multimedia card or MMC card. The electronic devices contain a flash memory card reader that is employed to read and/or write information on the flash memory cards that are inserted by end users. Quite often, flash memory cards are used to store content such as digital photographs or audio files by the end user.

If firmware or firmware components of the electronic device are to be changed, it is often very tricky to update the firmware components in an electronic device. If an update agent is not present in the device, the device firmware/software cannot be updated. The electronic device must have sufficient memory available to download an update package and to execute an update process. Often, electronic devices do not have sufficient memory for such downloading of entire new applications. If power is lost while changes to firmware or firmware components of the electronic device are being performed, the device is likely to malfunction, unless fault tolerant update mechanisms are implemented. Such update mechanisms may make the updating firmware more complicated. There are few efficient fault tolerant mechanisms that can be applied to constrained devices, and often it is not clear if these mechanism are compatible with the architecture of the device.

Attempts to upgrade firmware and/or software in electronic devices such as GSM phones, for example, are often hampered by the limited user interaction capabilities of the device, and the slow communication speeds available. End-user interactions cannot be relied upon, as they can be erroneous. In addition, some electronic devices may not have sufficient memory to store an update package as well as to install it in the non-volatile (NV) memory of the devices, such as in the flash memory.

Some mobile devices support the Multi-Media Card (MMC card) standard that grew out of a joint development between San-Disk Corporation and Siemens AG/Infineon Technologies AG, and was introduced in November, 1997. MMC cards typically weigh less than two grams, are about the size of a postage stamp, and are the world's smallest (24 mm×32 mm×1.4 mm) removable solid-state memory solution for mobile applications, such as MP-3 music players, portable video games, laptop computers, personal digital assistants (PDAs), mobile telephones, and digital cameras. These devices are convenient, reliable, rugged and lightweight standardized data carriers that store up to 64 Mbytes, sufficient for 64 minutes of MP-3 digital music, or approximately 40,000 book pages.

MMC cards typically use ROM technology for read-only applications and Flash technology for read/write applications. The cards are fast for excellent system performance, energy efficient for prolonged battery life in portable products, and cost-efficient for use in systems sold at consumer price points. The simple molded MMC card package has a seven pad (pin) serial interface. This easy-to-install simple serial interface offers easy integration into various devices regardless of the microprocessor used.

The MMC card has a wide variety of uses in some of the most exciting products on the market today. Mobile phones in use today typically are little more than a device to make and receive calls. Most pagers simply alert their owners to call a certain phone number. These limitations are due largely to small storage capability in mobile phones and pagers. The vast majority of mobile communication devices have less than one megabyte (MB) of storage.

MMC cards bring true mass storage capability to mobile phones and pagers. With this new Flash card technology, faxes, voice and e-mail messages, Internet files and software applications all can be downloaded to the new memory card and accessed on mobile phones and pagers. Unfortunately, the MMC cards are typically used only for storing multimedia content and not used for any other purpose.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware update using an update agent in a removable memory card, substantially as shown in and/or described in connection with at least one of the figures, as set forth more completely in the claims.

These and other advantages, aspects and novel features of the present invention, as well as details of an illustrated

DETAILED DESCRIPTION OF THE INVENTION

Aspects of the present invention relate generally to the process of updating software/firmware in electronic devices, and more specifically, to the use of flash memory cards or a Multi Media Card (MMC card) for providing an update agent for updating firmware/software in an electronic device. The following discussion makes reference to the term "electronic device", that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion also makes reference to a Multimedia Card with respect to the operation of representative embodiments of the present invention. Although examples using MMC cards are discussed herein, other forms of memory cards such as, for example, Compact Flash (CF) cards, Secure Digital (SD) cards, integrated circuit cards, PCMCIA cards, smart cards, and other portable memory devices may be employed without departing from the spirit and scope of the present invention.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, etc. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., software errors) in the operating code of the electronic device. In a representative embodiment of the present invention, update information may comprise an update package.

Figure 1:
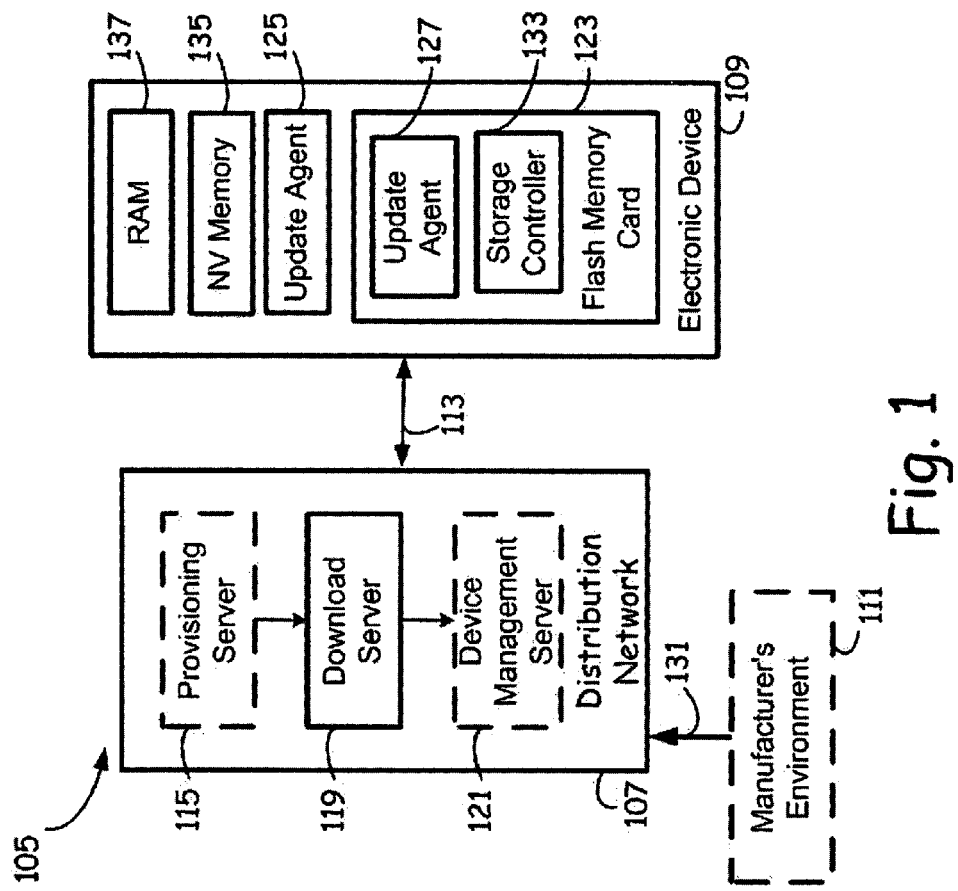
FIG. 1 is perspective block diagram of an update network comprising an electronic device with a flash memory card, a distribution network, and an optional manufacturer's environment, in accordance with a representative embodiment of the present invention.

FIG. 1 is perspective block diagram of an update network 105 comprising an electronic device 109 with a flash memory card 123, a distribution network 107, and an optional manufacturer's environment 111, in accordance with a representative embodiment of the present invention. In the illustration of FIG. 1, the electronic device 109 is communicatively coupled to the distribution network 107. Update packages generated by the manufacturer's environment 111 may be distributed by the distribution network 107 to the electronic device 109, in order to update firmware and/or software in the electronic device 109.

The electronic device 109 shown in FIG. 1 comprises a flash memory card 123, an update agent 125 used to update a firmware and/or software in a non-volatile memory 135 of the electronic device 109, and a RAM 137 where software applications may be executed. The update agent 125 may be employed by the electronic device 109 to update firmware and/or software resident in the NV memory 135. The update agent 125 may be specific to the hardware configuration of the electronic device 109 (i.e., 'close-to the-metal'), and may be part of the firmware of the electronic device 109. In a representative embodiment of the present invention, the update agent 125 may be capable of updating the firmware in a fault-tolerant mode using a bank-by-bank update process. The status of the update activity may not be progressively stored, but may instead be determined using pre-computed cyclic redundancy check values (CRCs) or digital signatures that may be provided as part of the update information in an update package. In a representative embodiment of the present invention, the update agent 125 may be resident in the NV memory 135.

In a representative embodiment of the present invention, the flash memory card 123 may comprise a storage controller 133, and an embedded update agent 127. The flash memory card 123 may also comprise MMC firmware (not shown) that is executed by the storage controller 133. The update agent 127 may be part of the MMC firmware (not shown), or it may be a separate executable component resident in the flash memory card 123. The storage controller 133 may support reading and writing into the flash memory card 123. The storage controller 133 may execute firmware embedded in the flash memory card 123. Thus, the storage controller 133 may be capable of executing the update agent 127.

In a representative embodiment of the present invention, an electronic device such as, for example, the electronic device 109 of FIG. 1 may employ an update agent like the update agent 127 in the flash memory card 123 to update firmware resident in the NV memory 135 of the electronic device 109. In a representative embodiment of the present invention, the electronic device 109 may also employ the update agent 127 in the flash memory card 123 to update application software and operating system components resident, etc. resident in the NV memory 135 of the electronic device 109.

In a representative embodiment of the present invention, the electronic device 109 may employ the update agent 127 in the flash memory card 123 to update firmware resident in the NV memory 135 of the electronic device 109, using an update package that is resident in the flash memory card 123. The update of the firmware resident in the NV memory 135 may be conducted in a fault-tolerant manner, using a bank-by-bank update process in accordance with a bank order. An example of a suitable bank-by-bank update process is provided in PCT Application having publication number WO/02/

41147 A1 and PCT Application No. PCT/US01/44034, entitled "System and Method for Updating and Distributing Information", filed Nov. 19, 2001, the complete subject matter of which is hereby incorporated herein by reference, in its entirety.

In a representative embodiment in accordance with the present invention, an electronic device such as, for example, the electronic device 109 may instruct the storage controller 133 to execute the update agent 127 in the flash memory card 123, to update firmware resident in the NV memory 135 of the electronic device 109 using an update package that is resident in the flash memory card 123. When the update agent 127 is executed by the storage controller 133, existing firmware in the electronic device 109 may be accessed in a block-by-block fashion, and a newer/updated version of the firmware of the electronic device 109 in the NV memory 135 may be assembled in the flash memory card 123. When the update process is complete, a newer/updated version of firmware may be available in the flash memory card 123. The newer/updated version of firmware may be installed into the NV memory 135 of the electronic device 109, replacing the old/original version of firmware in the NV memory 135. The electronic device 109 may be active and useable in a substantially normal fashion during the update of firmware by the update agent 127 in the flash memory card 123. During the subsequent transfer of the newer/updated version of firmware into the NV memory 135, however, the electronic device 109 may be unavailable for normal use. An appropriate message may be displayed to the user of the electronic device 109 to indicate that the firmware in NV memory 135 is being updated, and that the electronic device 109 is unavailable for the duration of the update. In a similar fashion, various software applications and/or operating system components in the NV memory 135 of the electronic device 109 may be updated by the storage controller 133, executing the update agent 127 in the flash memory card 123. The various software applications and/or operating system components to be updated may be selectively deactivated before the update process. The various software applications and/or operating system components may then be updated, and subsequently activated after the update process is complete. If a reboot of the electronic device 109 is involved, the user of the electronic device 109 may be provided with an appropriate message, and user opt-in may be solicited before invoking a reboot after the update.

In a representative embodiment of the present invention, the storage controller 133 of FIG. 1 may be, for example, a 32-bit configurable microprocessor capable of executing firmware in the flash memory card 123, as well as executing the update agent 127. The storage controller 133 may be used in content protection, and in verification of update packages during an update activity. The storage controller 133 may also manage communication with the electronic device 109 via a communication link 113, when the flash memory card 123 is communicatively coupled (e.g., plugged into a corresponding flash memory card reader) to the electronic device 109. In a representative embodiment of the present invention, the communication link 113 may comprise, for example, a wired interface such as a serial interface or a universal serial bus (USB) interface, and may comprise a wireless interface such as, for example, a cellular network interface, a Bluetooth network interface, and an Institute of Electrical and Electronics Engineers (IEEE) 802.11a/b/g/n network interface. Other forms of interface may also be employed for communication link 113, without departing from the spirit and scope of the present invention.

In a representative embodiment in accordance with the present invention, the update agent 127 may employ in its update activities an update package downloaded to the flash memory card 123. The update agent 127 may create a newer/updated version of firmware for the electronic device 109, in the flash memory card 123. The newer/updated version of firmware in the flash memory card 123 may subsequently be used to update existing firmware that is resident in the NV memory 135 of the electronic device 109. In another representative embodiment of the present invention, the update agent 127 may employ, in its update activities, an update package downloaded by the electronic device 109 to the NV memory 135. The update agent 127 may create a newer/updated version of the firmware of the electronic device 109, in the flash memory card 123.

In a representative embodiment of the present invention, a 'ready' status flag may be used by the update agent 127, to indicate to the electronic device 109 that a new version of firmware is available in the flash memory card 123. The ready status flag, along with other details of the newly updated firmware (or software) such as, for example, the location of the updated firmware/software, applicable security information, the size of the updated firmware/software, and other details may be resident in the flash memory card 123, in one representative embodiment of the present invention. Such information may reside in specific locations in the NV memory 135, in another representative embodiment in accordance with the present invention.

In a representative embodiment of the present invention, the storage controller 133 (or another processor in the flash memory card 123) may be employed by the electronic device 109 to create a newer/updated version of firmware resident in the NV memory 135 of the electronic device 109. When the newer/updated version of the firmware of the electronic device 109 is ready, a status flag either in, for example, the NV memory 135 or in the flash memory card 123, may be set indicating the status and other details of the newer/updated firmware version. During the update process in the flash memory card 123, the electronic device 109 may be operational for normal use. The update agent 125 (that may, for example, be different from the update agent 127) may subsequently update old/original firmware in the NV memory 135. This may occur, for example, after a reboot or power-up of the electronic device 109.

In a representative embodiment of the present invention, the update agent 125 may copy a newer/updated version of firmware, a block at a time, from the flash memory card 123 to the NV memory 135, to update firmware in the NV memory 135. Instructions used for copying the newer/updated version of firmware from the flash memory card 123 to the NV memory 135 may come from a "secondary" update package processed by the update agent 125. In a representative embodiment of the present invention, the update agent 127 may use a "primary" update package to update old/original firmware/software into the newer/updated version of firmware/software stored in the flash memory card 123. The terms "primary" and "secondary" are used herein to denote separate portions of update information employed during the update of the firmware in the electronic device 109, and are not intended to denote a level of importance. In a representative embodiment of the present invention, the primary and secondary update packages may be in separate update packages, or may be combined into one update package.

In a representative embodiment of the present invention, the update agents 125 and 127 may comprise similar update agents and may execute instructions provided in an update package(s). The update agent 127 may be responsible for creating a newer/updated version of firmware/software in the flash memory card 123, and for setting status flags and status information. The update agent 125 may be responsible for accessing the newer/updated version of firmware/software from the flash memory card 123, and for updating the corresponding old/original version of firmware/software in the NV memory 135.

The electronic device 109 of FIG. 1 is shown communicatively coupled to a distribution network 107 that may provide access to update packages (e.g., secondary and primary, or a single combined update package). In a representative embodiment of the present invention, update packages may be employed by an electronic device such as, for example, the electronic device 109 to update firmware/software in the electronic device 109 with the help of a storage controller and update agent in a flash memory card such as, for example, the storage controller 133 and the update agent 127 in the flash memory card 123, and an update agent in the electronic device 109 such as the update agent 125, for example.

In a representative embodiment of the present invention, an electronic device and distribution network such as, for example, the electronic device 109 and the distribution network 107 of FIG. 1 may comprise a communications network capable of distributing update packages to electronic devices such as, for example, the electronic device 109. An optional manufacturer's environment 111 may provide update packages that are stored and disseminated to the electronic device 109 by the distribution network 107.

In a representative embodiment of the present invention, the update process may not involve a reboot of an electronic device such as the electronic device 109 of FIG. 1, for example, for some types of update packages. Whether or not the electronic device 109 is to reboot following an update of firmware/software may be communicated to the electronic device 109 by the download server 119, for example, when an update package is delivered to the electronic device 109. In some representative embodiments of the present invention, a type of reboot may be specified such as, for example, a "soft" reboot or a "hard" reboot, if it is desired that the electronic device reboot following the download of an update package and an update of firmware/software. Information such as a "reboot flag" may be communicated to an electronic device (e.g., a mobile handset) along with an update package, to specify a kind or type of reboot (e.g., "soft" or "hard".)

In a representative embodiment of the present invention, a memory such the NV memory 135 may, for example, comprise flash memory that is not removable from the electronic device 109. The flash memory card 123 may be removable media such as, for example, an MMC card.

In a representative embodiment of the present invention, a distribution network such as, for example, the distribution network 107 of FIG. 1 may comprise a device management server such as, for example, a Sync ML DM server used to manage firmware update activities. A Sync ML DM server may employ the Sync ML device management (DM) protocol, which is being developed under the oversight of the Open Mobile Alliance. The distribution network 107 may also comprise a download server and a provisioning server such as, the download server 119 and the provisioning server 115 of FIG. 1. The download server 119 may be used to download update packages to electronic devices such as the electronic device 109 of FIG. 1, and the provisioning server 115 may facilitate provisioning activities for the electronic device 109 in the update network 105.

Figure 2:
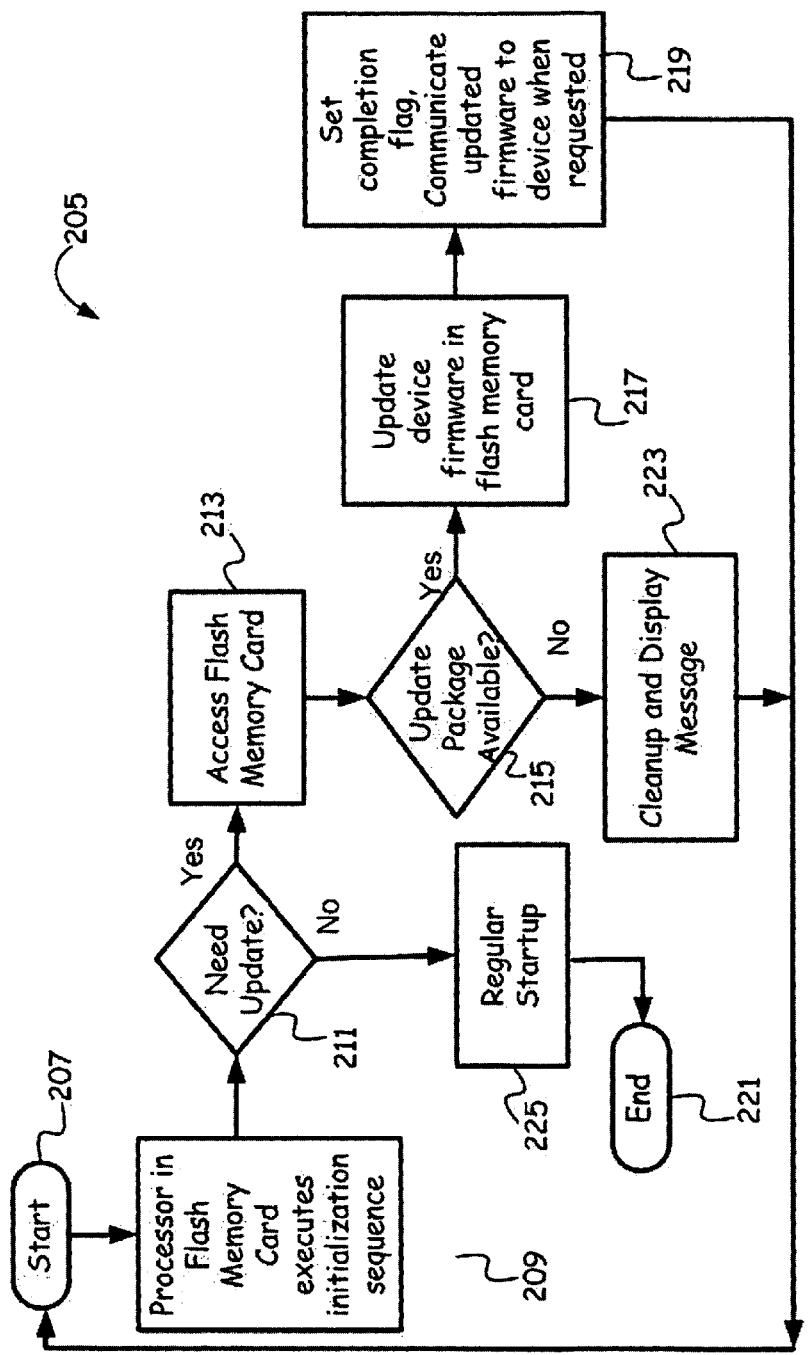
FIG. 2 is a flow chart illustrating an example of update-related actions of an electronic device such as, for example, the electronic device of FIG. 1 when it is powered up or restarted, in accordance with a representative embodiment of the present invention.

FIG. 2 is a flow chart illustrating an example of update-related actions of an electronic device such as, for example, the electronic device 109 of FIG. 1 when it is powered up or restarted, in accordance with a representative embodiment of the present invention. As an aid to understanding the update process, the following discussion makes reference to the elements of FIG. 1. The actions of the electronic device begin at the start block 207, when the electronic device (e.g., the electronic device 109) is powered up or restarted. At a next block 209, a storage controller such as, for example, the storage controller 133 (or another processor) in a flash memory card such as the flash memory card 123 of FIG. 1, for example, may execute an initialization sequence that may, for example, be part of an initial bootstrap operation. Then, at a next block 211, a determination may be made whether an update of firmware/software in the electronic device 109 is to be performed. If it is determined, at block 211, that an update of firmware/software in the electronic device is not to be performed, then regular startup of the electronic device may begin, at block 225, and the update-related actions of FIG. 2 end, at block 221.

If it is determined, at decision block 211, that an update of firmware/software in the electronic device 109 is to be performed, then at a next block 213, a flash memory card such as, for example, the flash memory card 123 of FIG. 1 may be accessed by an update agent such as the update agent 127, for example. An attempt may then be made, at decision block 215, to determine whether an update package is available in the electronic device 109. The update package may be located either in a flash memory card such as the flash memory card 123, or in memory in the electronic device 109 such as the NV memory 135, for example. If it is determined that an update package is available, control may be then passed to a next block 217, where an update agent such as, for example, the update agent 127 applies updates from the update package to the old/original firmware/software resident in memory of the electronic device such as the NV memory 135 of the electronic device 109. The update process may use one or more update packages, and may set status flags and/or status information in the flash memory card 123 to indicate success or failure of the update process. The newer/updated version of firmware/software may be stored in the flash memory card 123 as the update process progresses. Processing may then continue, at the start block 207, after a reboot or power cycle of the electronic device occurs.

Following the update of firmware/software in the electronic device (e.g., electronic device 109), the status flags and status information set in the flash memory card 123 during the updating of the old/original firmware/software may, at a next block 219, be communicated to the electronic device (e.g., electronic device 109). The newer/updated version of firmware/software may then be used to update the old/original version of the firmware/software resident in the NV memory 135. This update may comprise copying the newer/updated version of firmware/software from the flash memory card 123 to the NV memory 135. In a representative embodiment of the present invention, this activity may be conducted by an update agent in the electronic device such as, for example, the update agent 125. In addition, appropriate flags and/or status information may be set/reset by the update agent 125 to indicate success or failure of the update process. Processing may continue after a reboot or power cycle, at the start block 207.

If it is determined, at the decision block 215, that an update package is not available in the electronic device, then at a next block 223, cleanup operations may be initiated, and appropriate messages may be displayed to a user of the electronic device 109.

In a representative embodiment of the present invention, update agents such as, for example, the update agent 125 and the update agent 127 may be updated first, before the updating of other firmware/software in the NV memory 135.

In a representative embodiment of the present invention, at the block 217, an update agent resident in a flash memory card such as, for example, the update agent 127 in flash memory card 123, of FIG. 1, may update a firmware/software component resident in the same flash memory card. Such an update may employ an update package that is also resident in the same flash memory card. A completion flag may be set appropriately, at the next block 219, to indicate the completion of the update of the firmware/software component.

Figure 3:
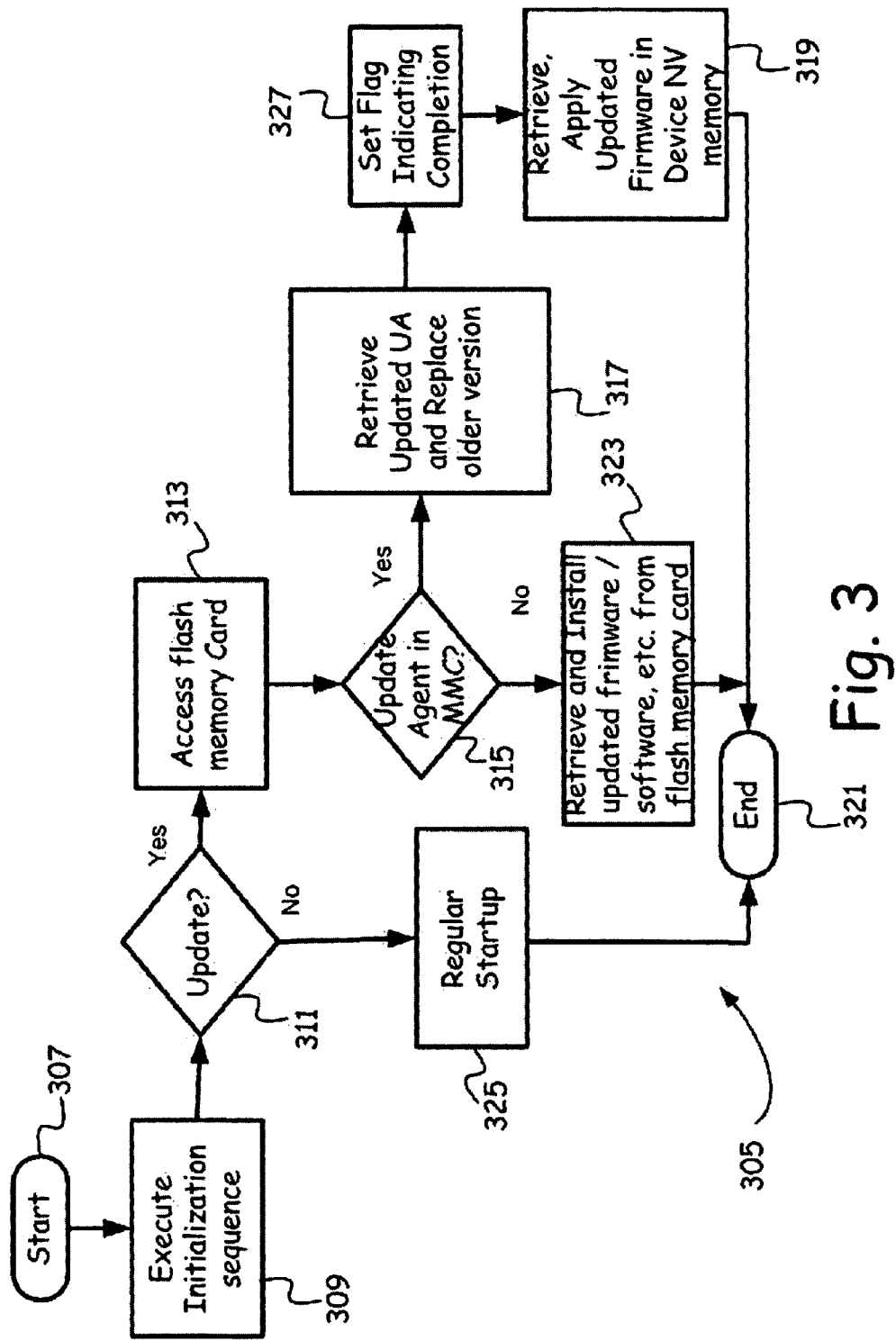
FIG. 3 is a flow chart illustrating another example of update-related actions of an electronic device that may correspond to, for example, the electronic device, when it is powered up or restarted, in accordance with a representative embodiment of the present invention.

FIG. 3 is a flow chart illustrating another example of update-related actions of an electronic device that may correspond to, for example, the electronic device 109, when it is powered up or restarted, in accordance with a representative embodiment of the present invention. As an aid to understanding, the following discussion makes reference to elements of FIG. 1. In the illustration of FIG. 3, a flash memory card such as, for example, the flash memory card 123 for an electronic device (e.g., the electronic device 109) may contain an 'updated' update agent, or updated firmware/software, that may be used either to update an update agent (e.g., the update agent 125) in the electronic device 109, or to transform the firmware/software in the NV memory 135 of the electronic device 109 into a newer version.

The actions of FIG. 3 begin at a start block 307 when, for example, an electronic device such as the electronic device 109 is powered up or restarted. At a next block 309, the electronic device 109 may execute an initialization sequence that may be executed as part of an initial bootstrap operation of the electronic device 109, for example. Then, at a next block 311, a determination may be made whether an update of firmware/software (or the update agent 125) in the electronic device 109 is desired. This determination may be performed, for example, by an update agent in the electronic device 109.

If it is determined that an update of the firmware/software (or the update agent 125) of the electronic device 109 is not desired, then at a next block 325, the regular startup of the electronic device 109 may be activated. The update-related actions illustrated in FIG. 3 may then terminate at the end block 321.

If it is determined at the decision block 311, however, that an update (e.g., of the update agent 125, firmware or software in NV memory 135) is desired and the associated updated firmware/software is available, then at a next block 313, the flash memory card 123 may be accessed by the update agent 125. Later, at a next decision block 315, an attempt may be made to determine whether a newer/updated version of the update agent 125 is available in the flash memory card (such as, for example, from a recent update by the update agent 127). If it is determined that a newer/updated version of the update agent 125 is not available in the flash memory card 123, control is passed to the next block 323, where the update agent retrieves and installs the newer/updated firmware/software and sets/resets appropriate flags to indicate success or failure of the update process. Processing then terminate at the end block 321. Processing may subsequently be restarted, for example after a reboot or power cycle, at the start block 307.

If, at the decision block 315, it is determined that a newer/updated update agent 125 is available in the flash memory card 123, then at a next block 317, the newer/updated update agent 125 may be retrieved from the flash memory card 123, and the authenticity of the newer/updated update agent 125 may be verified. Thus, a newer/updated update agent 125 may be delivered via the flash memory card 123 to the electronic device 109 for update of an update agent resident in NV (non-volatile) memory of the electronic device such as, for example, the update agent 125 resident in the NV memory 135 of FIG. 1. Then, the newer/updated update agent 125 may be installed in the NV memory 135 by the old/original version of the same update agent 125. The old/original update agent 125 may update itself to the newer/updated version of the update agent 125, employing the retrieved and selectively verified newer/updated update agent 125 from the flash memory card 123.

Following an update of the update agent 125, at a next block 327, flags and status information indicating the completion of the update of the update agent 125 may be set/reset appropriately.

Next, at block 319, the newer/updated update agent 125 may be activated and may update firmware/software in the NV memory 135, for example, by retrieving updated firmware/software from the flash memory card 123. The updated firmware/software may have been previously updated by the update agent 127. In addition, appropriate flags may be set/reset to indicate success or failure of the update process. Processing may then terminate, at the end block 321. A subsequent restart may occur at the start block 307, following a reboot or power cycle.

Figure 4:
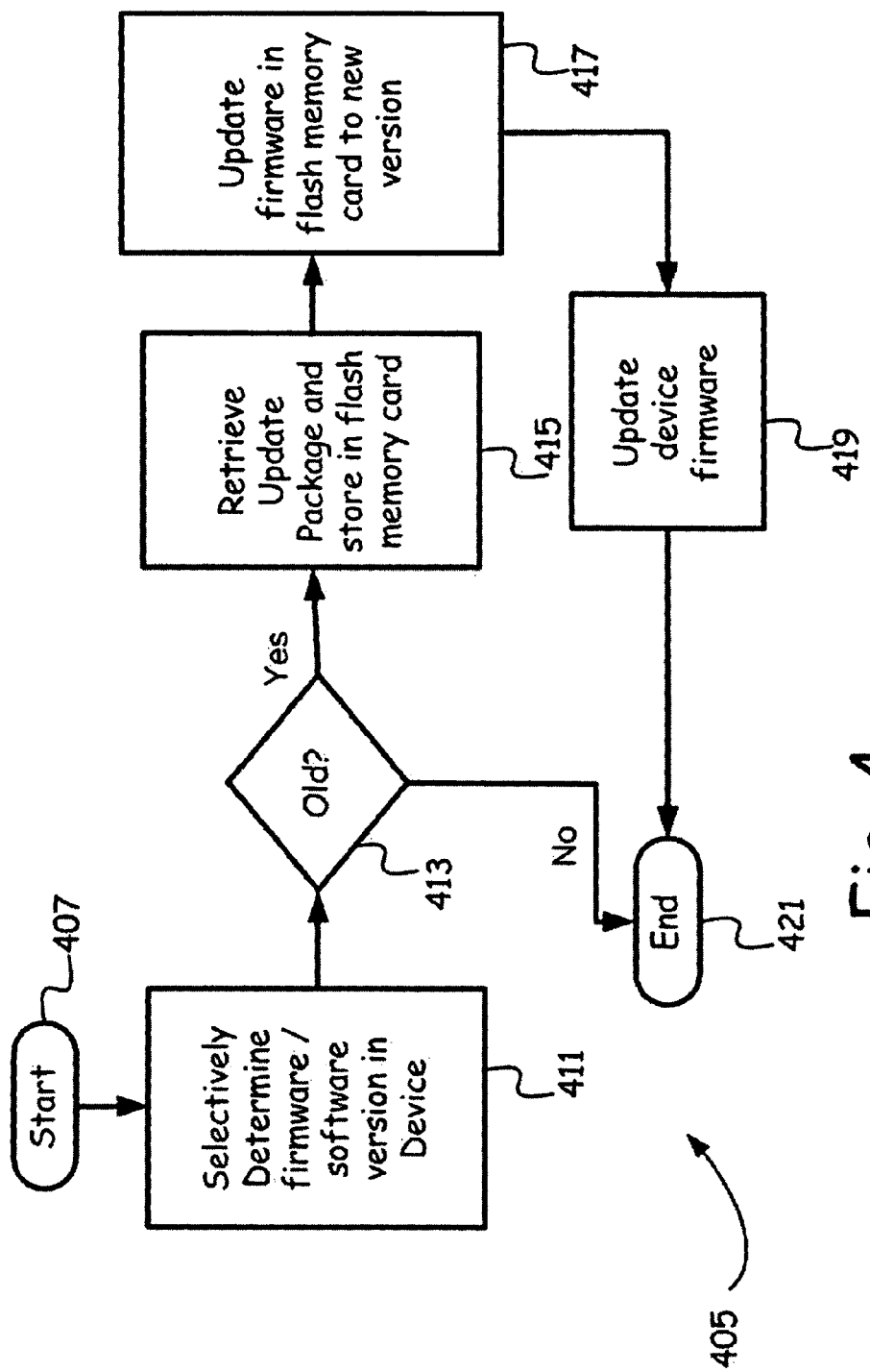
FIG. 4 is a flow chart illustrating an example of update-related actions of an electronic device that may correspond to, for example, the electronic device with the flash memory card, of FIG. 1, and the distribution network to which it is communicatively coupled, in accordance with a representative embodiment of the present invention.

FIG. 4 is a flow chart illustrating an example of update-related actions of an electronic device that may correspond to, for example, the electronic device 109 with the flash memory card 123, of FIG. 1, and a distribution network such as the distribution network 107 to which the electronic device 109 is communicatively coupled, in accordance with a representative embodiment of the present invention. As an aid to understanding the update process, the following discussion of the actions of FIG. 4 makes reference to the elements of FIG. 1. The illustration of FIG. 4 begins at a start block 407, at some time after power-up or restart of an electronic device such as the electronic device 109, for example. The electronic device 109 may, at block 411, detect/identify the firmware/software version in the electronic device 109. Such information may be provided to a server in the update network 105 such as, for example, a server within the distribution network 107. Next, at a decision block 413, a server in the distribution network 107 may determine whether the firmware/software currently employed by the electronic device 109 is an older/out-of-date version. If it is determined that the firmware/software in the electronic device 109 is not old/out-of-date, but is rather an updated or newer version, then the processing of FIG. 4 may terminate, at the end block 421. If, however, it is determined (at the decision block 413) that the firmware/software currently employed by the electronic device 109 is an older/out-of-date version to be updated to a newer/updated version then, at a next block 415, the distribution network 107 may retrieve appropriate update package(s) for updating the firmware/software in the electronic device 109 to a newer/updated version. The retrieved update package(s) may be stored in the flash memory card 123 that may, for example, comprise removable media.

Next, at block 417, the update agent 127 in the flash memory card 123 may employ the update package(s) to create the newer/updated version of firmware/software for the electronic device 109. The update agent 127 may also set/reset appropriate flags to indicate when the update is completed. For example, the update agent 127 may set address values of where the updated firmware/software is resident, how big the newer/updated firmware/software is, what security values (e.g., CRCs, digital signatures, etc.) must be verified, and other values/parameters.

Later, at block 419, the update agent 125 in the electronic device 109 may update the firmware/software of the electronic device 109 by retrieving and copying the newer/updated version of firmware/software from the flash memory card 123 into the NV memory 135. In one representative embodiment of the present invention, the retrieved firmware may be employed to create a newer/updated version of the update agent 125, that may then be stored in the NV memory 135. Finally, processing terminates in the end block 421.

In a representative embodiment of the present invention, an electronic device such as, for example, the electronic device 109 may be capable of updating an update agent by employing update packages provided by a flash memory card/MMC card such as the flash memory card 123. A representative embodiment of the present invention may be capable of first updating an update agent such as the update agent 125, and then updating firmware/software in the electronic device, employing the newer/updated update agent.

Although the present application is described with reference to a flash memory card, it must be understood that other types of flash memory card technologies such as, for example, Sony Memory Stick/Memory Stick Pro, MMC, Secure Digital (SD), SmartMedia (SMC), CompactFlash, type device may also be employed without departing from the spirit and scope of the present invention.

Aspects of the present invention may be found in a method of updating an electronic device comprising at least one of: firmware and software, where the electronic device may be capable of operatively coupling to a removable memory card. Such a method may comprise retrieving update information, authenticating update information in the removal memory card, and creating an updated version of the at least one of: firmware and software in the removable memory card using update agent code in the removable memory card based upon the update information. The method may also comprise copying the updated version of the at least one of: firmware and software to the non-volatile memory of the electronic device. Creating an updated version may comprise executing the update agent code on a controller in the removable memory card, thereby consuming the update information to upgrade at least a portion of the at least one of: firmware and software in the non-volatile memory of the electronic device. Executing the update agent code may comprise initializing parameters of the update agent code, referencing at least a portion of the at least one of: firmware and software, in a bank-by-bank fashion according to a bank order, and accessing at least a portion of the update information. The executing may also comprise sequentially updating in a bank-by-bank fashion according to the bank order, the at least a portion of the at least one of: firmware and software, and storing, in the removable memory card in a bank-by-bank fashion according to the bank order, the sequentially updated at least a portion of the firmware and software.

In a representative embodiment of the present invention, retrieving may comprise receiving update information from a server, and transferring the update information to the removable memory card. The update information may be resident in the removable memory card before the removable memory card is operatively coupled to the electronic device. The removable memory card may comprise a controller capable of executing the update agent code in the removable memory card. In addition, the removable memory card may comprise the update agent code and the update information. The update agent code may be executable by the controller to cause updating of the at least one of: firmware and software, using the update information. The controller may perform initialization as part of an initial bootstrap following operative coupling of the removable memory card to the electronic device and prior to the retrieving. The controller may establish access for the update agent code to the at least one of: firmware and software of the electronic device.

In a representative embodiment in accordance with the present invention, the copying may comprise determining that the update agent code has successfully completed creating the updated version of the at least one of: firmware and software, and soliciting user approval for updating the at least one of: firmware and software. The copying may also comprise transferring, upon obtaining user approval, the updated version of the at least one of: firmware and software from the removable memory card to the non-volatile memory of the electronic device. In various representative embodiments of the present invention, the removable memory card may comprise one of: a Multi-Media Card (MMC), a Compact Flash (CF) card, a Secure Digital (SD) card, a memory stick, an integrated circuit card, and a smart card. The electronic device may comprise one of: a mobile handset, a cellular telephone, a pager, and a personal digital assistant (PDA), and the update information may comprise a set of executable instructions for converting a first version of code to an updated version of code.

Other aspects of the present invention may be seen in a method of updating an electronic device comprising non-volatile memory containing at least one of: firmware and software, using first update agent code resident in the non-volatile memory. Such a method may comprise determining whether the first update agent code is a current version, and replacing the first update agent code with an updated version of the first update agent code from a removable memory card operatively coupled to the electronic device. The method may also comprise updating at least one of: firmware and software in the electronic device using the updated version of the first update agent code, and first update information associated with the at least one of: firmware and the software. In a representative embodiment of the present invention, replacing may comprise creating, in the removable memory card, the updated version of first update agent code, using second update information associated with the first update agent code and a second update agent resident in the removable memory card. Updating may comprise detecting whether an update of the at least one of: firmware and software is to be performed, and processing the first update information to update the at least one of: firmware and software. The first update information may be stored in the non-volatile memory of the electronic device to be used in place of an older version of update information available in the removable memory card. In some representative embodiments of the present invention, the electronic device, instead of replacing the first update agent code with an updated version of the first update agent code from the removable memory card, may update the first update agent code using update information provided by the removable flash memory card, prior to other updating activity.

A representative embodiment of the present invention may also comprise deleting the updated version of the first update agent code from the removable memory card after updating the at least one of: firmware and software. The replacing may comprise verifying authenticity of the updated version of the first update agent code provided in the removable flash memory card, copying the updated version of the first update agent code in the non-volatile memory to an appropriate location for the updated version of the first update agent code in the non-volatile memory, and validating the success of copying of the updated version. The electronic device may comprise one of: a mobile handset, a cellular telephone, a pager, and a personal digital assistant (PDA), and update information may comprise a set of executable instructions for converting a first version of code to an updated version of code. The removable memory card may comprise one of: a Multi-Media Card (MMC), a Compact Flash (CF) card, a Secure Digital (SD) card, a memory stick, an integrated circuit card, and a smart card.

Yet other aspects of the present invention may be found in an electronic device comprising non-volatile memory containing firmware, and a removable memory card having stored therein update agent code and update information. The update agent code may be executable to cause the updating of the firmware in the non-volatile memory to produce an updated firmware using the update information. The removable memory card may comprise a controller capable of executing the update agent code in the flash memory card, and the controller may be capable of updating at least a portion of the firmware of the electronic device employing the update agent code. The electronic device may comprise one of: a mobile handset, a cellular telephone, a pager, and a personal digital assistant (PDA), and update information may comprise a set of executable instructions for converting a first version of code to an updated version of code. The removable memory card may comprise one of: a Multi-Media Card (MMC), a Compact Flash (CF) card, a Secure Digital (SD) card, a memory stick, an integrated circuit card, and a smart card.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating an electronic device comprising at least one of:
firmware and software stored in a non-volatile memory of the electronic device, the electronic device capable of operatively coupling to a removable memory card, the method comprising:
retrieving update information of the least one of: firmware and software at the removable memory card;
authenticating the update information in the removable memory card;
creating an updated version in the removable memory card of the at least one of: firmware and software using update agent code resident in the removable memory card based upon the update information retrieved at the removable memory card by accessing the at least one of: firmware and software from the non-volatile memory of the electronic device, and updating the at least one of: firmware and software in the removable memory card;
copying by the update agent code resident in the removable memory card the updated version of the at least one of firmware and software from the removable memory card to the non-volatile memory of the electronic device; and
updating in the non-volatile memory by a different update agent code resident in the non-volatile memory the at least one of: firmware and software stored in the non-volatile memory of the electronic device using the copied updated version.

2. The method according to claim 1, wherein creating an updated version comprises executing the update agent code on a controller in the removable memory card, thereby consuming the update information to upgrade in the removable memory card at least a portion of the at least one of: firmware and software in the non-volatile memory of the electronic device.

3. The method according to claim 2, wherein executing the update agent code comprises:
initializing parameters of the update agent code;
referencing at least a portion of the at least one of: firmware and software, in a bank-by-bank fashion according to a bank order;
accessing at least a portion of the update information;
sequentially updating in a bank-by-bank fashion according to the bank order, the at least a portion of the at least one of: firmware and software in the removable memory card; and
storing, in the removable memory card in a bank-by-bank fashion according to the bank order, the sequentially updated at least a portion of the firmware and software.

4. The method according to claim 1, wherein retrieving comprises:
receiving update information from a server, and
transferring the update information to the removable memory card.

5. The method according to claim 1, wherein the update information is resident in the removable memory card before the removable memory card is operatively coupled to the electronic device.

6. The method according to claim 1, wherein the removable memory card comprises a controller capable of executing the update agent code in the removable memory card.

7. The method according to claim 6, wherein the removable memory card comprises the update agent code and the update information, the update agent code executable by the controller to cause updating of the at least one of: firmware and software, using the update information.

8. The method according to claim 1, wherein the controller performs initialization as part of an initial bootstrap following operative coupling of the removable memory card to the electronic device and prior to the retrieving, and wherein the controller establishes access for the update agent code to the at least one of: firmware and software of the electronic device.

9. The method according to claim 1, wherein the copying comprises:
- determining that the update agent code has successfully completed creating the updated version of the at least one of: firmware and software;
- soliciting user approval for updating the at least one of: firmware and software; and
- transferring, upon obtaining user approval, the updated version of the at least one of: firmware and software from the removable memory card to the non-volatile memory of the electronic device.

10. The method according to claim 1, wherein the removable memory card comprises one of a Multi-Media Card (MMC), a Compact Flash (CF) card, a Secure Digital (SD) card, a memory stick, an integrated circuit card, and a smart card.

11. The method according to claim 1 wherein the electronic device comprises one of: a mobile handset, a cellular telephone, a pager, and a personal digital assistant (PDA).

12. The method according to claim 1, wherein the update information comprises a set of executable instructions for converting a first version of code to an updated version of code.

13. The method of claim 1, wherein a ready status flag indicates to the electronic device that a new version of firmware is available in the removable memory before transferring.

14. An electronic device comprising:
- non-volatile memory containing firmware; and
- a removable memory card having stored therein update agent code and update information of the firmware, the update information authenticated in the removable memory card, the update agent code executable on the removable memory card to create an updated version in the removable memory card of the firmware based upon the update information by accessing the firmware from the non-volatile memory, and copy the updated version of the firmware from the removable memory card to the non-volatile memory; and cause a different update agent code resident in the non-volatile memory to update in the non-volatile memory the firmware using the copied updated version.

15. The electronic device according to claim 14 wherein a controller in the removable memory card is capable of updating in the removable memory card at least a portion of the firmware of the electronic device employing the update agent code.

16. The electronic device according to claim 14 wherein the electronic device comprises one of: a mobile handset, a cellular telephone, a pager, and a personal digital assistant (PDA).

17. The electronic device according to claim 14 wherein update information comprises a set of executable instructions for converting a first version of code to an updated version of code.

18. The electronic device according to claim 14 wherein the removable memory card comprises one of: a Multi-Media Card (MMC), a Compact Flash (CF) card, a Secure Digital (SD) card, a memory stick, an integrated circuit card, and a smart card.

19. The electronic device of claim 15, wherein the controller is a configurable microprocessor configured to execute in the removable memory card the update agent and firmware for content protection and verification of update packages during an update activity.

20. The electronic device of claim 15, wherein the controller is a configurable microprocessor configured to manage communication with the electronic device.

\* \* \* \* \*

UNITED STATES PATENT AND TRADEMARK OFFICE
CERTIFICATE OF CORRECTION

PATENT NO.       : 7,904,895 B1
APPLICATION NO.  : 11/111276
DATED            : March 8, 2011
INVENTOR(S)      : Chris Cassapakis et al.

It is certified that error appears in the above-identified patent and that said Letters Patent is hereby corrected as shown below:

On the face page, in field (73), Assignee, in column 1, line 1, delete "Develpment" and insert -- Development --, therefor.

In column 15, line 13, in Claim 10, delete "of" and insert -- of: --, therefor.

Signed and Sealed this
Nineteenth Day of July, 2011

David J. Kappos
*Director of the United States Patent and Trademark Office*